United States Patent Office 3,502,376
Patented Mar. 24, 1970

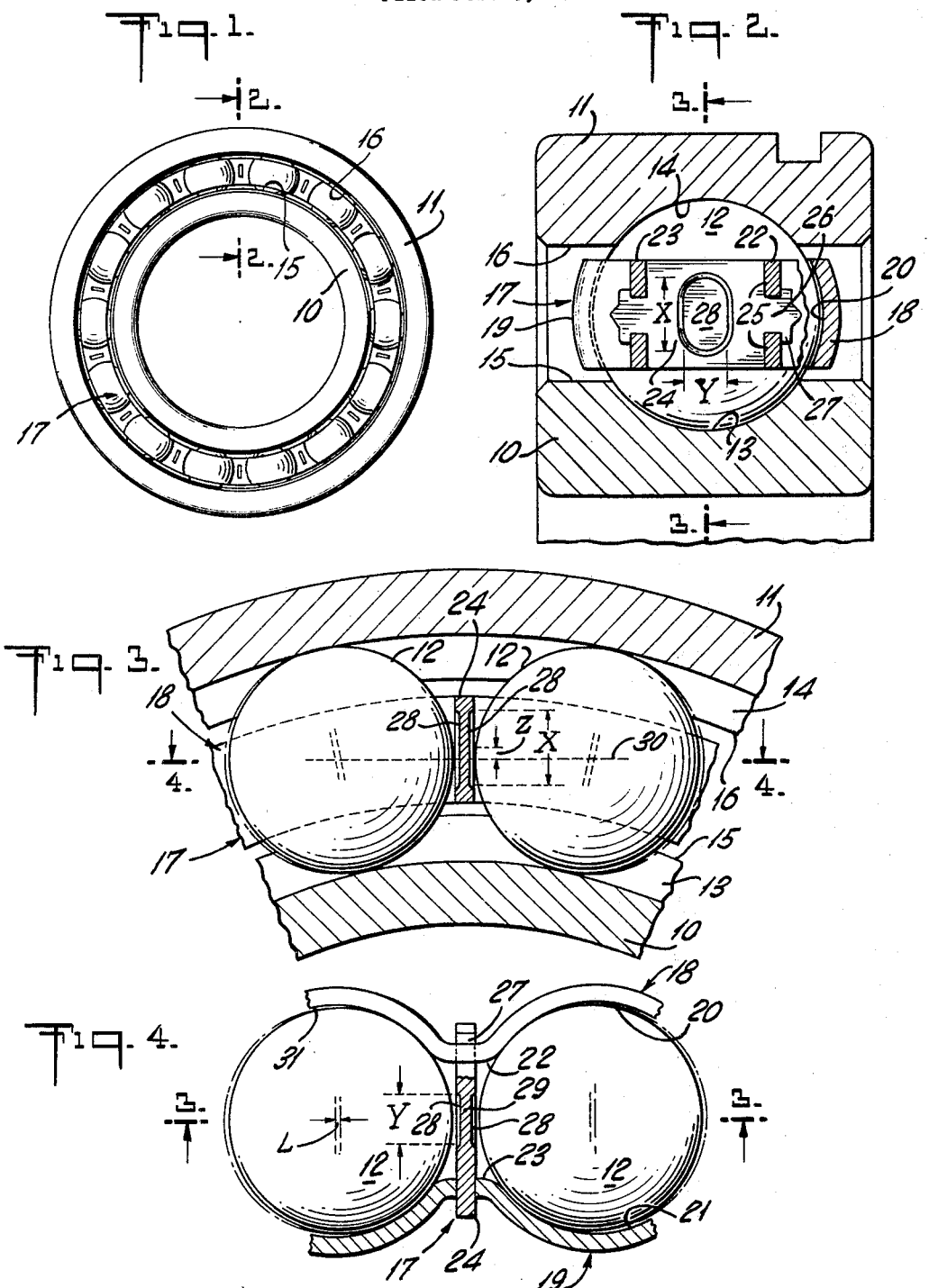

3,502,376
BEARING RETAINER
Howell L. Potter, New Britain, Conn., assignor to Textron, Inc., Providence, R.I., a corporation of Rhode Island
Filed Feb. 5, 1968, Ser. No. 702,974
Int. Cl. F16c 33/00, 19/20, 33/38
U.S. Cl. 308—193                                    2 Claims

ABSTRACT OF THE DISCLOSURE

The invention contemplates application to a ball bearing having a stayrod-type retainer for locating balls in opposed raceways of the bearing rings. The retainer is a rugged assembly of spaced annular side plates having ball-locating pockets, and heavy-gauge spacer or "stayrod" plates secure the side plates to each other, at locations between balls. Localized recesses in faces of the spacer plates provide clearance with respect to adjacent balls, without sacrifice of retainer strength and soundness, thus permitting a maximum ball complement for a given size bearing.

---

This invention relates to ball bearings and in particular to an improved ball-retaining ring construction, permitting maximum ball complements for given bearing sizes.

Retainers for ball bearings are known, in which annular side plates are formed with like numbers of ball-locating pockets, and in which spacer plates (called "stayrods") extend between these side plates to hold the spaced assembly of the side plates to the desired clearance with a complement of balls. For maximum load, the number of balls should be a maximum but ball-to-ball contact is generally not desirable in a rotating bearing. The spaces between balls must therefore be as close as possible, consistent with adequate strength in the retainer assembly. If the stayrods are stamped from sheet steel, the gauge must be relatively heavy to provide a secure assembly; but a heavy gauge for the stayrods imposes a severe limit on ball capacity of the ultimate product, particularly when it is considered that the balls must at all times clear the stayrods in order that the ball-locating function be accomplished solely by the ball pockets. Moreover, if balls are allowed to strike the stayrods, fatigue failure may result at juncture of the stayrods and side plates.

It is accordingly an object of the invention to provide an improved ball bearing and retainer construction of the character indicated.

A specific object is to provide retainer construction permitting a maximum complement of balls for a given-size bearing and at the same time providing rugged retainer structure which will locate the balls only at ball pockets.

Another object is to achieve the above objects with a structure involving the simplest possible part configurations so that no problem arises from end-for-end or side-for-side ambiguity of spacer orientation during the assembly of the retainer.

Other objects and various further features of novelty and invention will be pointed out or will occur to those skilled in the art from a reading of the following specification in conjunction with the accompanying drawing. In said drawings which show, for illustrative purposes only, a preferred form of the invention:

FIG. 1 is a view in end elevation showing a ball bearing of the invention;

FIG. 2 is an enlarged fragmentary sectional view taken at the plane 2—2 of FIG. 1;

FIG. 3 is a fragmentary sectional view taken at the plane 3—3 of FIG. 2; and

FIG. 4 is another fragmentary view of the structure of FIGS. 2 and 3, shown partly in section taken at the plane 4—4 of FIG. 3.

Briefly stated, the invention contemplates application to a ball bearing having a stayrod-type retainer for locating balls in opposed raceways of the bearing rings. The retainer is a rugged assembly of spaced annular side plates having ball-locating pockets, and heavy-gauge stayrods secure the side plates to each other, at locations between balls. Localized recesses in faces of the stayrods provide clearance with respect to adjacent balls, without sacrifice of retainer strength and soundness, thus permitting a maximum ball complement for a given size bearing.

Referring to FIG. 1 of the drawings, the invention is shown in application to a ball bearing of the so-called radial type in which inner and outer race rings 10–11 are held in spaced relation by plural balls 12. In FIGS. 2 and 3 the balls 12 are shown received in an inner raceway 13 in the ring 10, and an outer raceway 14 in the ring 11. These raceways face each other and are shown providing deep-seated contact with the balls so that the ball assembly for the form shown may take substantial radial and axial loads. Elevated land surfaces 15–16 adjacent the raceways 13–14 thus provide a relatively narrow radial gap between race rings 10–11, and retainer structure 17 of the invention must be accommodated in this gap and in clearance relation with the inner and outer rings 10–11. It will be understood that assembly of the balls to the bearing rings 10–11 may be accomplished by techniques well known in the art and forming no part of the invention. Thus, entrance slots or the like for accomplishing such assembly are not shown herein. It will further be understood that the retainer 17 in its ultimate assembled form is applied after the required number of balls has been assembled to the bearing.

The retainer in the form shown comprises two like spaced annular side plates 18–19 having like numbers of pockets 20–21 for locating the balls in closely spaced relation. The side plates are formed as continuous rings from sheet metal, pressed at pockets 20–21 to portions of concave spherical surfaces adapted to conform with small radial clearance to the sphericity of the balls 12. For the form shown, the supporting spherical section provided by side plates 18–19 straddles a diametric plane of symmetry for each ball; there is thus provided radial location as well as angular location with respect to all balls, and about the axis of the bearing. The formation of pockets 20–21 is such as to establish, between pocket locations, elevated platforms or pedestals (as at 22–23) enabling more extensively arcuate location of adjacent balls and also narrowing the gap over which stayrod-type spacers extend for completing the retainer assembly.

In the form shown, each stayrod-type spacer, such as spacer 24, is formed of relatively heavy-gauge sheet steel and is squarely located on corresponding pedestals 22–23 of the side plates 24; each pedestal 22–23 is characterized by an essentially flat upper surface as at 25 (FIG. 2) against which a similarly formed locating surface at the adjacent end of the stayrod 24 may squarely seat. A central aperture in the pedestal surface 25 receives a projection at the corresponding end of the stayrod 24. The nature of engagement of the projection 26 with this central aperture is preferably of rectangular configuration, so as to eliminate any tendency for angular wobble or ambiguity in the location of stayrod 24. The stayrod 24 is provided with deformable ends at its end projections 26 so that simple staking or other deformation (as at 27) will permanently secure stayrods 24 to the side plates 18–19.

As previously noted, the stayrods 24 are formed of relatively heavy-gauge stock which may be the same gauge stock as that from which the side plates 18–19 are formed.

The use of heavy stock imposes a limitation on the tolerable ball-center spacing if clearance is to be maintained at all times with the stayrods 24. The ball-center spacing can be reduced (for employment of a given size ball) or the bearing capacity could be increased by employment of larger diameter balls (for a given ball-to-ball spacing), but such techniques would require stayrods 24 of lesser gauge, thus reducing the retainer's strength, rigidity, and mechanical stability.

I have found that this difficulty can be eliminated without any noticeable impairment of retainer soundness by providing a localized recess, depression, or excavation (as at 28) in the stayrod wall face immediately adjacent each ball 12. Such depressions may be formed as a coining operation, in the stage of blanking or other production of stayrods 24 from strip stock.

At the location of depressions or recesses 28' the stayrod stock remains continuous at a web 29 which is fully surrounded by full-gauge stock constituting the major part and body of the stayrod 24, and thus in no sense materially weakening the stayrod structure, regardless of the moment of inertia axis about which deflection considerations are applied.

In FIG. 3 the imaginary line 30 between adjarent ball centers is seen to pass through the stayrod 24 at a location closer to the inner ring land 15 than to the outer ring land 16. This is, of course, due to the chord 30 with respect to the circle of ball centers. This chord 30 is seen to be well within the radial inner limit of the recesses 28 so that a maximum number of balls 12 may be accommodated in clearance relation with the stayrod 24.

In accordance with a further feature of the invention, the formation of stayrods 24 involves both end-for-end and side-for-side symmetry, so that regardless of the orientation of the stayrod 24, at its time of assembly to the end plates 18–19, the foregoing features of ruggedness and adequate clearance will apply. Thus the radial extent X of the depressions 28 (see FIGS. 2 and 3), preferably exceeds the axial extending dimension Y (see FIGS. 2 and 4), by substantially the extent Z (see FIG. 3) to which the chord 30 cuts the circle of ball centers.

It will be appreciated that the resulting oval configuration for the depressions 28 (see FIG. 2) is completely symmetrical with respect to the surrounding body of the stayrods 24, and that such depressions 28 do not noticeably weaken the structure from any bending-moment consideration.

The fully assembled retainer may, as previously indicated, involve precise location of the side plates 18–19 to an extent assuring desired radial ball clearance as at 31 (FIG. 4) with resultant lattitude L for ball shifting or ball play with respect to the spherical surface of ball support. Also, regardless of the cumulative effect of such play, even in the presence of excessive loads, the recesess 28 assure adequate ball clearance and thus that the balls will, at all times, be located only by way of locating pockets 20–21.

In ideally designed ball bearings the pitch diameter of the balls should be one-half the sum of bore and outer diameters. Ball size is related to and is usually sixty percent of the radial section. The use of recesses in the stayrods provides greater circumferential space on the pitch circle thus allowing the use of an extra ball of a predetermined size or an equal complement of larger balls. Therefore a higher capacity bearing can be provided as well as the maintenance of good design by avoiding the need to change the ball size and/or complement and shifting the pitch diameter to an "off pitch" position.

While I have described the invention in detail, for the preferred form shown, it will be understood that modifications may be made without departing from the scope of the invention as defined in the claims which follow.

What is claimed is:

1. A ball bearing including spaced race rings having opposed raceways and plural balls riding said raceways, and a stayrod-type retainer for said balls, said retainer comprising spaced annular side plates having like numbers of pockets for locating said balls in closely spaced relation, and flat stayrod plates securing said side plates in opposed spaced relation at locations between ball pockets, each of said balls having clearance relation with its pocket, each of said stayrod plates having end-for-end symmetry and having a lateral wall facing an adjacent ball, said walls having like coined continuous recesses in the immediate vicinity of the balls adjacent thereto and in clearance relation with such balls, said recesses being radially elongated to an extent providing clearance with adjacent balls, regardless of the end-for-end orientation of said stayrod plates in their individual secured relation to said side plates, each recess being fully surrounded by full-gauge stock constituting the major part and body of its stayrod plate, whereby the retainer is in no sense materially weakened, regardless of the moment of inertia axis about which deflection considerations are applied.

2. A bearing according to claim 1, in which said side plates are characterized by pedestals extending toward each other between pockets, each pedestal including a substantially flat stayrod-locating platform having a central aperture, each stayrod plate having a deformable end projection symmetrically positioned between locating shoulder abutments, said abutments squarely locating against said platform with said projection extending through the aperture and deformed against the back of said platform in permanently secured relation thereto, each said stayrod plate having additional symmetry laterally with respect to an axis through both end projections thereof, each said aperture and each said projection being of mating rectangular sectional contour, whereby rugged assembly of said retainer and maximum ball content of said bearing are assured, together with assured ball clearance at all stayrod plates regardless of the end-for-end or side-for-side orientation of each stayrod plate upon assembly of said retainer.

References Cited

FOREIGN PATENTS 149,270   3/1921   Great Britain.
90,373   10/1920   Switzerland.

MARTIN P. SCHWADRON, Primary Examiner

F. SUSKO, Assistant Examiner

U.S. Cl. X.R.

308—201